United States Patent

Ipri

[15] 3,688,037

[45] Aug. 29, 1972

[54] SYNCHRONIZING SYSTEM

[72] Inventor: Alfred Charles Ipri, Marlton, N.J.

[73] Assignee: RCA Corporation

[22] Filed: Sept. 30, 1970

[21] Appl. No.: 76,778

[52] U.S. Cl. ..............................178/69.5 TV, 328/63

[51] Int. Cl. ..........................................H04m 5/06

[58] Field of Search ....328/63, 72, 73, 179; 307/269; 178/69.5 G, 69.5 TV; 179/15 BS

[56] References Cited

UNITED STATES PATENTS

| | | | |
|---|---|---|---|
| 3,517,127 | 6/1970 | Grace | 178/69.5 TV |
| 3,530,238 | 8/1970 | Matarese | 178/69.5 TV |
| 3,582,963 | 6/1971 | Bennett | 178/69.5 G |
| 3,567,861 | 3/1971 | Webb | 178/69.5 G |

*Primary Examiner*—Robert L. Griffin
*Assistant Examiner*—Donald E. Stout
*Attorney*—Eugene M. Whitacre

[57] ABSTRACT

A vertical phase synchronization system for a television receiver develops vertical deflection frequency signals by employing a resetable frequency divider circuit to count down clock pulses having a frequency twice the horizontal deflection frequency. The resultant internally generated vertical signals are compared with received external vertical synchronization signals. If a phase error exists, a pulse width detector to which external sync pulses subject to noise are applied, is activated. When activated, the pulse width detector develops a reset pulse for the frequency divider to lock the phase of the internally generated vertical signals with external vertical sync in response only to a pulse of the requisite vertical sync pulse duration, thereby providing noise immunity for the system.

13 Claims, 3 Drawing Figures

INVENTOR.
Alfred C. Ipri
BY H.W. Reick
ATTORNEY

INVENTOR.
Alfred C. Ipri
BY H.W. Reick
ATTORNEY

SYNCHRONIZING SYSTEM

The present invention relates to an improved synchronizing system for a television receiver.

In conventional television receivers, vertical deflection synchronization is achieved by injection locking a 60Hz local oscillator. The vertical deflection phase is established independently of the receiver horizontal deflection system. When impulse noise occurs, the starting time of the vertical sweep may vary causing picture instability or jitter. In extreme cases, the vertical sync signals may be obliterated by noise and vertical roll of the picture results. The system of the present invention, however, provides a vertical deflection signal whose starting time is related to the horizontal deflection frequency and which is relatively noise immune.

As well as having the advantage of being highly noise immune, the present system displays improved vertical lock-in performance, since a phase comparison is taken every television field by a phase comparator which can detect relatively small phase errors. Another advantage of the present system is that it is self-locking with regard to the vertical deflection system, and no consumer vertical hold control is necessary.

An embodiment of the invention includes a clock pulse source operating in synchronism with the horizontal deflection system but at twice the horizontal deflection frequency. The clock pulse source drives a resetable frequency divider to develop a vertical frequency synchronizing signal. The phase of the vertical synchronizing signal from the frequency divider is compared with the incoming vertical sync and, if the signals are out of phase, the frequency divider is reset to establish the desired synchronization between the internally generated sync and the received vertical synchronization signals. When in sync, the frequency divider is reset automatically and the vertical circuit remains isolated from outside noise. A detector which discriminates between external synchronization signals and noise pulses on the basis of pulse width, includes a reset pulse generator to provide a reset pulse for the frequency divider only when the internal and external synchronization signals are out of phase and when an external synchronization pulse is detected.

The present invention can best be understood by referring to the figures and accompanying description in which.

Figures 1, 3:
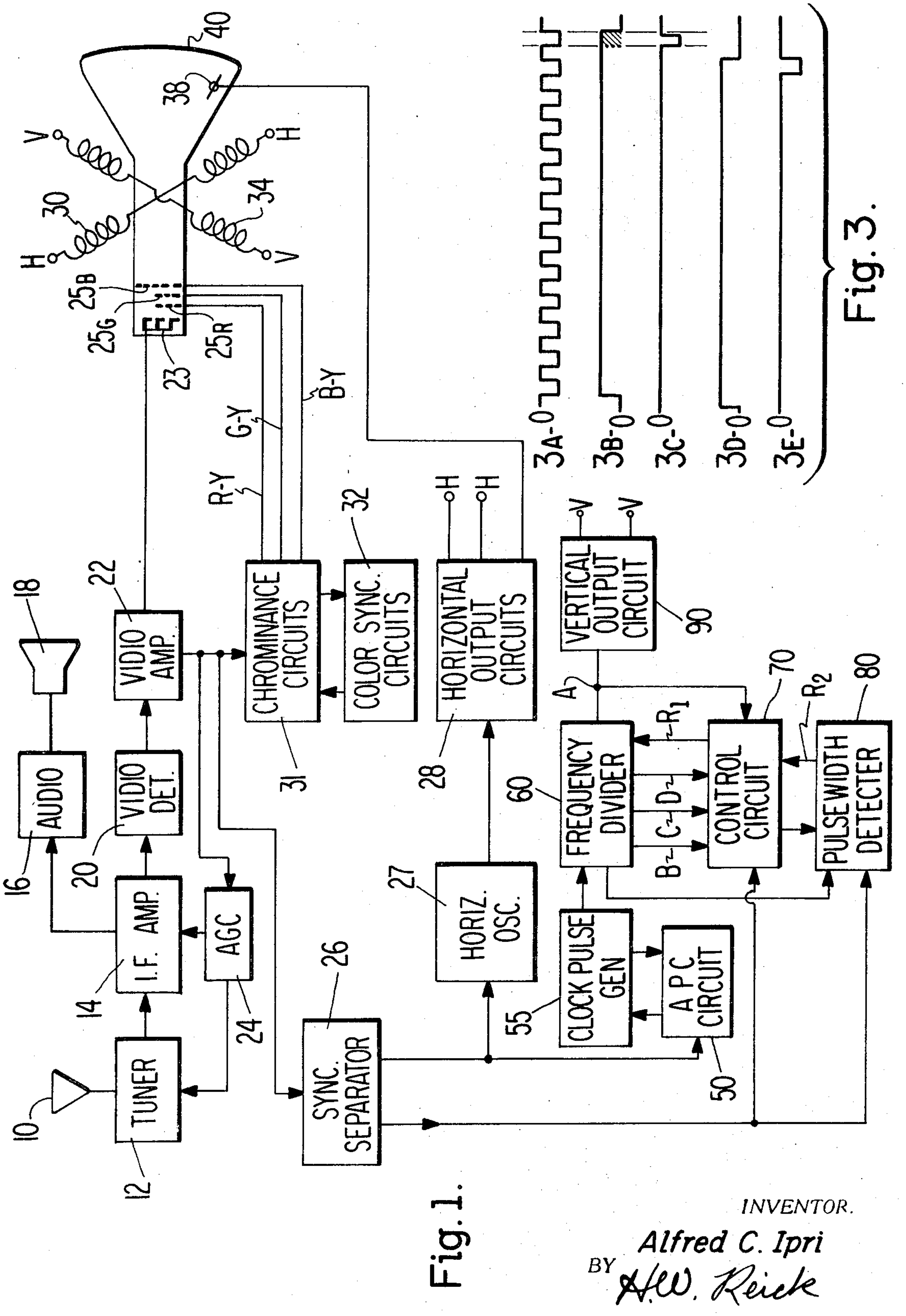
FIG. 1 is a block diagram of a color television receiver including a synchronizing system embodying the present invention.
FIG. 3 is a timing diagram showing waveforms at various circuit locations in FIG. 2.

Referring to FIG. 1, an antenna 10 is coupled to a tuner 12 which selects the desired radio frequency signals of a predetermined broadcast channel, amplifies these signals, and converts the amplified radio frequency signals to a lower intermediate frequency (I.F.) signals. The tuner 12 is coupled to an I.F. amplifier 14 which amplifies the I.F. signals. The I.F. amplifier 14 supplies signals to an audio processing circuit 16 which detects audio information, amplifies it, and couples the resultant audio frequencies to a speaker 18 to reproduce the audio portion of the transmitted television program.

Another output of I.F. amplifier 14 is coupled to a video detector stage 20 which derives luminance, chrominance and synchronization information from the intermediate frequency signals. The output of video detector stage 20 is coupled to a video amplifier stage 22. Outputs from video amplifier 22 are coupled to an automatic gain control stage 24, a sync separator stage 26 and a chrominance section 31. Luminance (Y) signals are coupled from the video amplifier 22 to control elements such as cathodes 23 of a color kinescope 40.

The automatic gain control stage 24 operates in a conventional manner to provide gain control to an R.F. amplifier in tuner 12 and to I.F. amplifier 14. Chrominance section 31 operates in conjunction with a color synchronization section 32 to derive color information signals from the signals supplied by video amplifier 22 and applies these signals to control elements 25*r*, 25*g* and 25*b* of color kinescope 40 to reproduce a color image when color information is being transmitted. Keying pulses for the color synchronization section 32 can be supplied from a winding on the horizontal output transformer (not shown).

Sync separator stage 26 separates synchronization information from the video information and also separates the horizontal synchronization information from the vertical synchronization information. Horizontal synchronizing pulses from sync separator 26 are applied to a horizontal oscillator 27 which may include automatic frequency control means for developing a horizontal deflection frequency signal in the proper phase relationship with the horizontal sync pulses. The horizontal frequency signal from stage 27 is applied to the horizontal output circuit 28 which may include, for example, a horizontal deflection output amplifier for producing the desired horizontal deflection current which is applied to the horizontal yoke 30 by means of interconnecting terminals H—H.

The horizontal output circuit 28 also includes a circuit for developing an ultor voltage in response to flyback pulses present in the horizontal output stage. The ultor voltage is coupled to a high voltage terminal 38 on kinescope 40.

Horizontal sync pulses from sync separator 26 are also applied to an automatic phase control (A.P.C.) circuit 50 which synchronizes a clock pulse generator 55 to maintain the clock pulse frequency of generator 55 at exactly twice the frequency of the incoming horizontal sync pulses. Generator 55 may be a multivibrator having a free running frequency near double the horizontal deflection frequency and which responds to control signals from stage 50 to lock at twice the horizontal deflection frequency. The output of generator 55 is coupled to a frequency divider 60 which includes several counter circuits to divide the 31.5KHz clock pulses by 525 to produce 60Hz signals at an output terminal A. It is noted that an output from frequency divider 60 may be employed to provide horizontal deflection frequency signals for the horizontal output circuits 28 thereby eliminating the need for a separate horizontal oscillator stage 27.

The resultant 60Hz pulses appearing at output terminal A of stage 60 each have a width equal to 6.5H (H =63.5 microseconds). These vertical rate signals are applied to a vertical output circuit 90 which may include, for example, a vertical deflection amplifier for producing the vertical deflection current which can be applied to the vertical deflection yoke 34 by means of interconnections V—V. The internally generated vertical signals present at terminal A are also applied to a control circuit 70.

Vertical synchronization pulses from sync separator 26 are also applied to control circuit 70 and to a pulse width detector 80. Sync separator 26 may include a sync amplifier and clipper stage for providing relatively sharp-edged vertical sync pulses at its output terminal. It is noted that these pulses are of approximately 6.5H duration, whereas the transmitted vertical sync pulses are of 3H duration. This time difference is due to the response of the vertical sync separator integrator circuit and is a common effect in sync separator circuits generally. Although the vertical sync pulses from stage 26 in the preferred embodiment are 6.5H in width and the pulse width detector 80 is designed to count 13 clock pulses (which corresponds to a period of time equal to 6.5H) other embodiments utilizing sync separators which produce vertical sync pulses in varying widths may employ a pulse width detector designed for the particular pulse width from the sync separator of that particular embodiment.

Control circuit 70 includes a coincidence gate to detect the coincident arrival of the internal and external sync signals. A gate circuit in control circuit 70 responds to signals coupled from the counters in frequency divider 60 by means of interconnecting conductors B, C and D and the internally generated vertical signal also applied to the gate circuit to produce a pulse corresponding in time to the 525th clock pulse applied to stage 60 from clock pulse generator 55. This pulse is coupled through additional gate circuits in control circuit 70 and is applied to the counters in stage 60 by means of conductor $R_1$ to internally reset the counters each vertical deflection interval.

The 525th clock pulse, which serves as the internal reset pulse is additionally coupled to a flip-flop circuit in control circuit 70. The flip-flop changes state to produce an enabling signal which is applied to the pulse width detector 80 only when the coincident gate in stage 70, which is coupled to a steering input of the flip-flop, does not detect coincidence between internal and external vertical sync during the 525th clock pulse period.

Pulse width detector 80 includes a first gate circuit to which are applied clock pulses from frequency divider 60, vertical sync pulses from sync separator 26, and enabling pulses from control circuit 70. The gate passes clock pulses to counter circuits in stage 80 only upon the coincident arrival of an enabling pulse from stage 70 and a signal from stage 26. An additional gate circuit in stage 80 is coupled to the counters such that only when the first gate has passed a predetermined number of clock pulses the sum of which corresponds in width to the width of an external sync pulse (6.5H) will the additional gate circuit produce a reset pulse. This reset pulse is applied to the control circuit by means of a conductor $R_2$. The control circuit will apply the reset pulse to conductor $R_1$ and thereby apply the pulse to frequency divider 60. Thus, pulse width detector 80 is activated only if a phase error exists between the internally generated vertical signals (internal sync) at terminal A and the external vertical sync pulses and produces a reset pulse at its output only in response to and in timed relationship with an incoming pulse from the sync separator 26. This reset pulse starts frequency divider 60 at the proper time to develop at output terminal A, vertical frequency signals which are in phase with the external sync pulses.

If external sync is obliterated with noise, pulse width detector 80 is not activated and will not produce a reset pulse. Frequency divider 60 will then be reset by the internal reset pulse applied to stage 60 via conductor $R_1$. The detailed operation of the frequency divider 60, the control circuit 70, and the pulse width detector 80 is presented in conjunction with the following description of FIG. 2 and the waveforms illustrated by FIG. 3.

Figure 2:
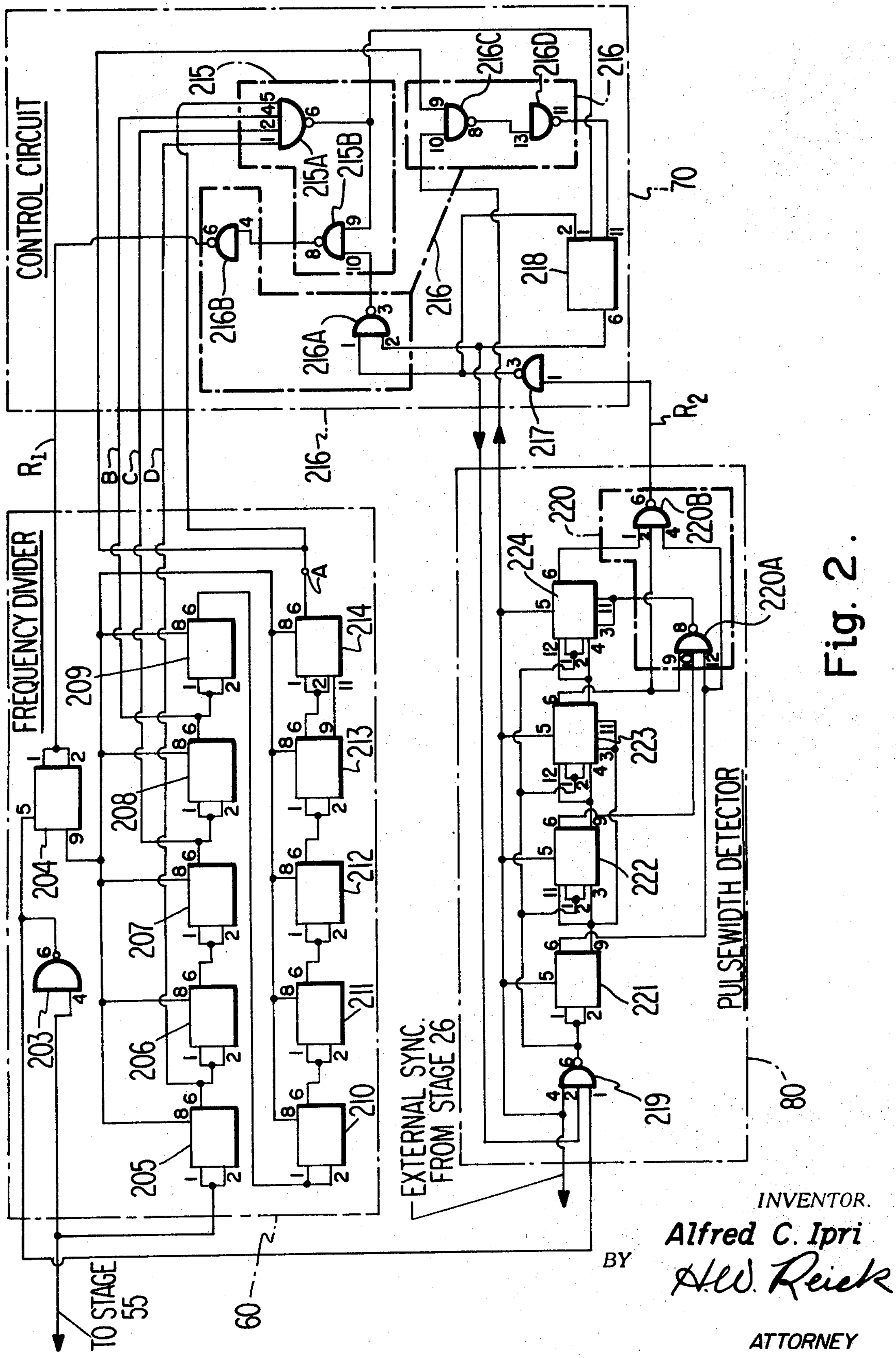
FIG. 2 is a schematic diagram of the frequency divider, the pulse width detector, and the control circuit shown in block diagram form in FIG. 1.

In FIG. 2, clock pulses from clock pulse generator 55 are applied to input terminals 1 and 2 of a flip-flop circuit 205 and to an input terminal 4 of an inverting gate circuit 203. An output terminal 6 of gate circuit 203 is coupled to a terminal 5 on a flip-flop circuit 204 and to pulse width detector 80. Gate circuit 203 may be fabricated employing an RCA digital integrated circuit type CD 2201 or its equivalent. When so employed, the terminal numbers in the FIGURE correspond to the terminals of the integrated circuit as described in an Application Note, File No. 132 published by the RCA Corporation, Electronic Components and Devices, Harrison, N.J. in 1967. The flip-flop circuits 204 through 214 can all be fabricated by employing an RCA digital integrated circuit type CD 2203 or its equivalent, in which case, the terminal numbers shown in FIG. 2 correspond to the terminal numbers of the integrated circuit as described in an Application Note, File No. 133, published by the RCA Corporation, Electronic Components and Devices, Harrison, N.J. in 1967. The flip-flop circuits 205 through 214 have their terminal 8 interconnected at a common junction which is coupled to an output terminal 9 of stage 204. An output terminal 6 of stage 205 is coupled to input terminals 1 and 2 of stage 206 and also to control circuit 70 by means of conductor D. An output terminal 6 of stage 206 is coupled to input terminals 1 and 2 of stage 207. Output terminal 6 of stage 207 is coupled to input terminals 1 and 2 of stage 208 and to control circuit 70 by means of conductor C. An output terminal 6 of stage 208 is coupled to input terminals 1 and 2 of stage 209 and to control circuit 70 by means of conductor B. An output terminal 6 of stage 209 is coupled to input terminals 1 and 2 of stage 210. Likewise, output terminal 6 of stages 210, 211, 212 and 213 are coupled to the input terminals 1 and 2 of the successive stages 211, 212, 213 and 214. In addition, an output terminal 9 of stage 213 is coupled to an input terminal 11 of stage 214. At output terminal 6 of stage 214 (terminal A) appears the vertical frequency internal sync signal which is applied to the control circuit 70 and to the vertical output circuit 90.

The clock pulses from stage 55 are divided by the series coupled flip-flop stages by 525 to produce at terminal A the desired vertical frequency signals. Reset pulses from control circuit 70 are applied to the counter stages by means of conductor $R_1$ which is coupled to input terminals 1 and 2 of flip-flop 204.

In control circuit 70, the individual gate circuits of circuit 215 may be fabricated from an RCA digital integrated circuit type CD 2200 or its equivalent, in which case, the terminal numbers shown in FIG. 2 will correspond to the terminal numbers of the integrated circuit as described in an Application Note, File No. 132, published by the RCA Corporation, Electronic Components and Devices, Harrison, New Jersey in 1967.

The gate circuits 216 and 217 can be fabricated from a single RCA type CD 2201 or its equivalent. In such case, the terminal numbers correspond to the integrated circuit as described in the Application Note op. cit. supra. Flip-flop 218 can be fabricated from an RCA digital integrated circuit type CD 2203 or its equivalent, in which case, the terminal numbers shown in FIG. 2 will correspond to the terminal numbers of the integrated circuit as described in the Application Note op. cit. supra.

Gate 215A of circuit 70 has a signal applied at an input terminal 1 from the output terminal 6 of the first counter circuit 205 in frequency divider 60. A terminal 2 of gate 215A is coupled to the output terminal 6 of the fourth counter 208 in frequency divider 60. The output terminal A of frequency divider 60 is coupled to an input terminal 5 of gate 215A. Output terminal 6 of gate 215A is coupled to an input terminal 9 of gate 215B and to an input terminal 1 of flip-flop 218. External vertical sync pulses from stage 26 are applied to an input terminal 10 of coincidence gate 216C, and internally generated sync pulses from terminal A of divider counter 60 are applied to an input terminal 9 of coincidence gate 216C. The output terminal 8 of gate 216C is coupled to an inverter gate 216D at an input terminal 13. Output terminal 11 of gate 216D is coupled to input terminal 11 of flip-flop 218. Output terminal 6 of flip-flop 218 is coupled to input terminal 2 of gate 216A.

Conductor $R_2$ couples reset pulses from the pulse width detector 80 to an inverter gate 217 at an input terminal 1. The output terminal 3 of gate 217 is coupled to an input terminal 1 of gate 216A and to an input terminal 2 of flip-flop 218. The output terminal 3 of gate 216A is coupled to an input terminal 10 of gate 215B. An output terminal 8 of gate 215B is coupled to the input terminal 4 of an inverting gate 216B. Conductor $R_1$ is coupled from the output terminal 6 of gate 216B to supply reset pulses to frequency divider 60.

In discussing the operation of stage 70, it is important to note that the internally generated sync pulse at terminal A from the frequency divider 60 (shown in FIG. 3B) corresponds to the time interval from the 512th clock pulse from oscillator 50 to the 525th clock pulse, both measured from the end of the reset period of stage 60. When in synchronization with the external vertical sync, this time period aligns with the vertical sync pulse period of the external sync pulse from sync separator 26. In other embodiments, this coincidence may not be necessary.

During in-sync operation, pulses from the frequency divider 60 which are applied to the input terminals of gate 215A provide a pulse at the output terminal 6 of gate 215A which corresponds to the 525th clock pulse. The external and internal sync signals are compared by coincidence gate 216C which provides at output terminal 8 a pulse during the time interval the internal and external sync pulses overlap. This signal, applied to the steering input 11 of flip-flop 218 by means of inverter gate 216D will inhibit flip-flop 218 from triggering due to the application of the 525th clock pulse on input 1. Thus, the phase comparison between the internal and external sync effectively takes place only during the time interval of the 525th clock pulse or the 13th clock pulse period of the internal sync pulse interval. This is illustrated in FIG. 3B by the cross hatched area of the trailing edge of the internally generated sync pulse. If there is coincidence between the internal and external sync at this time, the output at terminal 6 of flip-flop 218 remains at its quiescent value and produces no enabling pulse to activate pulse width detector 80. Also, gate 216A is inhibited thereby preventing the application of any false triggers from pulse width detector 80 to gate 215B. Divider 60 is reset by the 525th clock pulse present at the output terminal 6 of gate 215A which is coupled to conductor $R_1$ through gates 215B and 216B. It is noted that this pulse will reset frequency divider counter 60 every vertical deflection cycle during in-sync or out-of-sync conditions. This internal reset pulse is shown in FIG. 3C.

During out-of-sync conditions where there is no coincidence between the internal and external vertical sync during the 525th clock pulse interval, the steering input signal applied to terminal 11 of flip-flop 218 will be absent during this pulse period and flip-flop 218 will be triggered by the pulse applied to terminal 1 to produce a signal at its output terminal 6. This signal serves to activate pulse width detector 80 which operates to develop a reset pulse in timed relationship with the arrival of the next incoming vertical sync pulse from sync separator stage 26. The reset pulse from stage 80 is applied to terminal 1 of inverting gate 217 and the resulting reset pulse present at terminal 3 of gate 217 is applied to input terminal 1 of gate 216A. Gate 216A is not inhibited during this time, since the output terminal 6 of flip-flop 218 is not at its quiescent state at the time of arrival of the leading edge of the reset pulse. The reset pulse is therefore coupled through gate 216A to terminal 10 of gate 215B and coupled through gate 215B and 216B to reset frequency divider 60 in phase with the externally applied sync pulse.

The external vertical sync signal is shown in FIG. 3D in out-of-phase relationship with the internal sync pulse shown in FIG. 3B. The reset pulse generated by stage 80 is shown in FIG. 3E and resets frequency divider 60 to provide at output terminal A thereof, a vertical signal in phase relationship with the external vertical sync. The reset pulse present at terminal 3 of gate 217 is also applied to input terminal 2 of flip-flop 218 to reset the multivibrator. Once flip-flop 218 is reset, gate 216A is again inhibited to prevent further vertical sync signals or noise from reseting divider counter number 1. Having described the operation of the control circuit 70, a description of the pulse width detector 80 follows.

Clock pulses from frequency divider 60 are shown in FIG. 3A and are applied to a terminal 1 on a gate circuit 219. Gate 219 can be fabricated from an RCA digital integrated circuit type CD 220 or its equivalent, in which case, the terminal numbers shown in FIG. 2 correspond to the terminal numbers of the integrated circuit as described in an Application Note, op. cit. supra. Also applied to gate 219 at a terminal 4 are external sync signals from sync separator stage 26 which have been amplified and clipped in stage 26. The external vertical sync from separator 26 is shown in FIG. 3D. The enabling signal from stage 70 is applied to gate 219 at its terminal 2. An output from gate 219 is derived at terminal 6 which is coupled to a counter 221, a counter 222, a counter 223, and a counter 224 at common input terminals 1 and 2 of each counter. Gate 219 is arranged to pass clock pulses to output terminal 6 only in the presence of an enabling signal at input terminal 2 and a signal at terminal 4.

Pulse width detector 80 is so called because it will not generate a reset pulse at terminal 6 of gate 220B unless the proper initiating signals are present at input terminals 1, 2 and 4 of gate 219. The external vertical sync signal, shown in FIG. 3B, must be present at terminal 4 of gate 219 to enable the counters 221–224 to count 13 clock pulses, the thirteenth of which becomes the reset pulse. It should be noted that the counters 221–224 will count as long as the proper level signals are present at the input terminals of gate 219. Thus, a noise pulse at input terminal 4 of gate 219 could start the counter if the other signals were present also. However, the counters 221–224 are coupled such that the enabling pulse at input terminal 4 must be equal to the duration of the external vertical sync pulse before a reset pulse is generated. In this manner incorrect reset pulse generation by noise pulses is prevented because the counter in effect searches for an enabling pulse (the external vertical sync pulse) of a certain width equal to the duration of thirteen clock pulses before the reset pulse is generated.

Counters 221–224 are identical RCA type CD 2203 digital integrated circuits. The terminal numbers correspond to the terminals in the Application Note describing the CD 2203 circuit op. cit. supra. Terminal 5 of the flip-flops are interconnected and coupled to a terminal 4 of gate 219. Counter 221 has an output terminal 6 coupled to a terminal 12 of gate 220A and a terminal 4 of a gate 220B. A second output terminal 9 of counter 221 is coupled to interconnected input terminals 3 and 11 of counters 222 and 223. Output terminal 6 of counter 222 is coupled to a terminal 10 of gate 220A. Output terminal 9 of counter 222 is coupled to interconnected input terminals 4 and 12 of counter 223. Output terminal 6 of counter 223 is coupled to input terminal 9 of gate 220A and to input terminal 2 of gate 220B. Output terminal 9 of counter 223 is coupled to interconnected input terminals 4 and 12 of counter 224. An output terminal 6 of counter 224 is coupled to an input terminal 1 of gate 220B. A reset pulse developed at output terminal 6 of gate 220B is coupled to a gate 217 in stage 70 by means of a conductor $R_2$. Gates 220A and 220B can be fabricated from a single RCA digital integrated circuit (220) type CD 2200 or its equivalent. When so fabricated, the numbered terminals on circuit 220 correspond to the terminals as described in the RCA Application Note corresponding to the CD 2200 circuit op. cit. supra.

During in-sync operation, pulse width detector 80 is not active, since no enabling pulse is applied to terminal 2 of gate 219 from control circuit 70. During out-of-sync operation, however, gate 219 receives an enabling pulse at its terminal 2 and passes clock pulses applied to its terminal 1 during the time duration of the sync pulse applied from stage 26 to its terminal 4. Counters 221–224 are flip-flops which each divide by two the number of signals applied to their inputs. The train of clock pulses applied to their inputs provide at their output terminals, signals which when gated in circuit 220 produce a reset pulse only when 13 clock pulses have been passed by gate 219. Gate 220B provides a reset pulse at its terminal 6 only when counters 221, 223 and 224 have proper output states at terminal 6 of each stage and counter 222 has its terminal 9 at a predetermined state. This condition only will exist if 13 clock pulses (corresponding to the time duration of a vertical sync pulse from stage 26) have passed through gate 219.

The reset pulse on conductor $R_2$ is shown in FIG. 3E. It's leading edge is aligned with the leading edge of the 13th clock pulse through gate 219 which occurs at the end of the external vertical sync pulse period as illustrated by FIGS. 3D and 3E. The clock pulses of FIG. 3A correspond to the FIGS. 3B and 3E. The width of the reset pulse is relatively narrow (0.5 microseconds) since, as described above, it resets counters 221–224, thereby returning terminal 6 of gate 220B to its quiescent state.

What is claimed is:

1. A synchronization system for providing an output signal in synchronism with synchronization signals subject to noise interference, said system comprising:
   - generating means for producing signals of a frequency desired to be synchronized with said synchronization signals,
   - fist means coupled to said generating means for detecting a phase error between said signals and said synchronization signals, and
   - second means for detecting signals whose duration is equal to said synchronization signal duration, said second means being coupled to said means for producing a signal representative of said phase error and enabled by said signal representative of said phase error only during an out-of-phase condition between said signals and said synchronization signals for producing a reset pulse in fixed time relationship to said synchronization signal, said reset pulse being coupled to said generating means for controlling said generating means to change the phase of said signals produced by said generating means to be in timed relationship with said synchronization signals whereby noise pulses of a duration less than said synchronization signal do not reset said generating means.

2. A circuit as defined in claim 1 wherein said generating means comprises an oscillator and a divider counter which divides the oscillator frequency to produce signals of the desired frequency, said divider counter being resetable to vary the phase of the output signal.

3. A circuit as defined in claim 2 wherein said oscillator is a multivibrator circuit.

4. A circuit as defined in claim 1 wherein said means for comparing the phase of said signals with said synchronization signals comprises:
   - a coincidental gate, and
   - control means for producing an enabling signal when said coincident gate detects a phase error between said synchronization signals and said internally generated signals.

5. A circuit as defined in claim 1 wherein said means for signals whose duration is equal to said synchronization signal comprises a pulse width detector to detect signals having a time duration of synchronization signals.

6. A circuit as defined in claim 5 wherein said pulse width detector includes gate circuit means for producing a reset pulse which is applied to said generating means to synchronize said signals produced by said generating means with said detected synchronization signal.

7. A synchronization system comprising:

an oscillator synchronized by first synchronizing pulses to provide output signals frequency related by an integer multiple to said first synchronization pulse frequency, a frequency divider circuit coupled to said oscillator for converting said oscillator output signals into second frequency signals, a coincidence detector, means for applying said second frequency signals to said coincidence detector, a source of second synchronization signals, means for applying said second synchronization signals to said coincidence detector, said second synchronization signals having a frequency to which said second frequency signals are to be synchronized, said coincidence detector for detecting being selected phase differences between said second frequency signals and said second synchronizing signals equal to the period of said oscillator output signals, and pulse width detector means coupled to said coincidence detector and having said second synchronization signals applied thereto for detecting the presence of said second synchronization signals and for providing a reset signal in response to said second synchronization signals, said reset signal being applied to said frequency divider circuit to lock the phase of said second frequency signals produced thereby to said second synchronization signals when said coincidence detector detects phase disagreement between said second synchronization signals and said second frequency signals.

8. A circuit as defined in claim 7 wherein said pulse width detector produces said control signal only in response to an applied signal having a pulse width at least as long a time duration as said second synchronizing signals.

9. In a television receiver, a vertical deflection signal generator comprising:

a clock pulse generator synchronized to twice the horizontal synchronization pulse frequency to produce clock pulses, resetable counter means coupled to said generator for producing vertical deflections frequency signals from said clock pulses, a coincidence detector circuit, means for applying vertical synchronization pulses to said coincidence detector, means for applying said vertical deflection frequency signals to said coincidence detector, said coincidence detector adapted to provide an enabling pulse in the event said vertical synchronization pulses are in phase disagreement with said vertical deflection signals, a pulse width detector coupled to said coincidence detector and activated by said enabling pulse from said coincidence detector, means for applying said clock pulses to said pulse width detector, means for applying said vertical synchronization signals to said pulse width detector, and gate circuit means coupled to said pulse width detector and to said divider counter and adapted to provide a reset pulse which is applied to said divider counter to reset said divider counter only when a predetermined number of clock pulses have been detected by said pulse width detector, thereby indicating the presence of a vertical synchronization pulse, said divider counter being responsive to said reset pulse to cause said vertical deflection frequency signals generated therein to be in synchronism with said vertical synchronization signals.

10. A circuit as defined in claim 9 wherein said pulse width detector further includes input gate means adapted to pass clock pulses upon the coincident arrival of said enabling pulses and said synchronization signals which are applied to said pulse width detector.

11. A circuit as defined in claim 10 wherein said clock pulses from said input gate means are applied to counter means.

12. A circuit as defined in claim 11 wherein said gate circuit means is coupled to said counter means and responsive to signals therefrom to produce a reset pulse only after a predetermined number of clock pulses have been passed by said input gate means.

13. In an image reproducing system of the type responsive to a video signal having recurrent horizontal and vertical synchronization pulses, a vertical synchronization system comprising:

means for providing a signal source having a repetition rate related to the horizontal synchronization pulse repetition rate, a frequency divider coupled to said signal source to provide an output signal related in repetition rate and phase to said vertical synchronization pulse, said frequency divider being responsive to reset pulses to control the initiation of the frequency division and thereby the phase of the output signal from said frequency divider, vertical synchronization pulse detecting means coupled to receive said vertical synchronization pulses and a higher frequency signal for producing an output signal in response to the coincidence of a vertical synchronization pulse and a predetermined number of cycles of said higher frequency signal, coincidence detector means coupled to receive said output signal from said frequency divider and said vertical synchronization signal, and reset pulse developing means coupled to said vertical synchronization pulse detecting means and said coincidence detector to reset said frequency divider in the absence of proper coincidence between said output signal from said frequency divider and said vertical synchronization pulses and when said vertical synchronization detecting means provides an output pulse.

* * * * *

UNITED STATES PATENT OFFICE
CERTIFICATE OF CORRECTION

Patent No. 3,688,037 Dated August 29, 1972

Inventor(s) Alfred Charles Ipri

It is certified that error appears in the above-identified patent and that said Letters Patent are hereby corrected as shown below:

Column 8, line 32, that portion reading "fist" should read -- first --; line 36, after "signal" and before "said" delete "duration". Column 9, line 29, after "detector" insert -- being selected --; line 30, after "detecting" delete "being selected".

Signed and sealed this 20th day of February 1973.

(SEAL)
Attest:

EDWARD M.FLETCHER,JR.
Attesting Officer

ROBERT GOTTSCHALK
Commissioner of Patents